(12) United States Patent
Ito

(10) Patent No.: US 7,509,091 B2
(45) Date of Patent: Mar. 24, 2009

(54) BROADCAST RECEPTION SYSTEM, MOBILE TERMINAL AND SERVER

(75) Inventor: Tamotsu Ito, Ayase (JP)

(73) Assignee: Hitachi, Ltd., Tokyo (JP)

( * ) Notice: Subject to any disclaimer, the term of this patent is extended or adjusted under 35 U.S.C. 154(b) by 556 days.

(21) Appl. No.: 11/196,502

(22) Filed: Aug. 4, 2005

(65) Prior Publication Data
US 2006/0117345 A1 Jun. 1, 2006

(30) Foreign Application Priority Data
Dec. 1, 2004 (JP) ............................. 2004-347984

(51) Int. Cl.
*H04H 40/00* (2008.01)
(52) U.S. Cl. ..................... 455/3.06; 455/3.05
(58) Field of Classification Search ............... 455/3.05, 455/3.06, 3.02, 414.4, 427; 370/389
See application file for complete search history.

(56) References Cited

U.S. PATENT DOCUMENTS

| | | | |
|---|---|---|---|
| 2002/0013945 A1 | 1/2002 | Nashida et al. | |
| 2002/0025777 A1* | 2/2002 | Kawamata et al. | 455/3.05 |
| 2003/0081587 A1* | 5/2003 | Ishiyoshi | 370/345 |
| 2004/0052504 A1 | 3/2004 | Yamada et al. | |

FOREIGN PATENT DOCUMENTS

| | | | |
|---|---|---|---|
| CN | 1496122 A | 5/2004 | |
| JP | 2001-346137 A | 12/2001 | |
| JP | 2003-339041 A | 11/2003 | |
| JP | 2003-348510 A | 12/2003 | |
| JP | 2004-112076 A | 4/2004 | |
| JP | 2004-140460 A | 5/2004 | |
| JP | 2004-193973 A | 7/2004 | |
| JP | 2004-289372 A | 10/2004 | |

OTHER PUBLICATIONS

Chinese Office Action, w/ English translation thereof, issued in Patent Application No. 2005100891929 dated on Aug. 8, 2008.

* cited by examiner

*Primary Examiner*—Tu X Nguyen
(74) *Attorney, Agent, or Firm*—McDermott Will & Emery LLP (57) ABSTRACT

A broadcast reception system with improved usability is disclosed. The system includes a broadcast receivable mobile terminal and a server capable of sending and receiving data to and from the mobile terminal. This terminal has a first broadcast receiver and a first communication unit for data communication with the server. The server has a second broadcast receiver, a second communication unit for data communication with the mobile terminal, and a storage unit for storing therein the data received by the second broadcast receiver. When the first broadcast receiver goes bad in reception state, the mobile terminal transmits by the first communication unit to the server a send request information signal which calls for transmission of broadcast data. Upon receipt of this request, the server sends the data received from the storage unit to the mobile terminal by the second communication unit.

12 Claims, 10 Drawing Sheets

RAW FILE

FIG.7B

FILLING FILE

FIG.7C

FILLED FILE

| BROADCAST STATION | YYY TV | YYX TV | YYZ TV |
|---|---|---|---|
| CHANNEL # | XX ch | XY ch | XZ ch |
| 1800 | NEWS | CHILDREN'S PROGRAM | WEATHER REPORT |
| 15 | | | TRAVEL INFO PROGRAM |
| 30 | QUIZ SHOW | | |
| 45 | | | |
| 1900 | HOME DRAMA | NEWS | BASEBALL |
| 15 | | | |
| 30 | | FOOTBALL | |
| 45 | | | |
| 2000 | CINEMA | | |
| 15 | | | |
| 30 | | | |
| 45 | | | |

FIG.11

| ITEMS | CONTENTS |
|---|---|
| CHANNEL RECEIVED | XX ch |
| BROADCAST STATION NAME | YYY TV |
| PROGRAM ID NO. | NN |
| PROGRAM TITLE | HOME DRAMA |
| TV PROGRAM START TIME | 19:00 |
| TV PROGRAM END TIME | 20:00 |

FIG.12

| ITEMS | TIME |
|---|---|
| TV PROGRAM START TIME | t1 |
| RECEPTION FAILURE START TIME | t2 |
| RECEPTION FAILURE END TIME | t3 |
| TV PROGRAM END TIME | t4 |

BROADCAST RECEPTION SYSTEM, MOBILE TERMINAL AND SERVER

INCORPORATION BY REFERENCE

The present application claims priority from Japanese application JP2004-347984 filed on Dec. 1, 2004, the content of which is hereby incorporated by reference into this application.

TECHNICAL FIELD

The present invention relates to a broadcast receivable mobile terminal and a server and also to a broadcast reception system using the mobile terminal and the server.

BACKGROUND

A technique for enabling, when a desired television (TV) program is reserved for video-recording by means of a mobile cellular telephone handset, a server apparatus to make video-recording of such reserved TV program is disclosed in JP-A-2003-339041. Upon receipt of a TV program watch request from this mobile phone, the server apparatus converts the data format of a recorded TV program into a data format that is appropriate for a display unit of the mobile phone, and then transmits it to the mobile phone via a wide area network, such as the Internet.

JP-A-2003-348510 discloses therein a TV-receivable mobile terminal capable of recording broadcast contents for later reproduction.

An approach to using a communication link to receive an entirety of TV program data with its time length of one hour or two hours is faced with a problem as to an increase in communication charge or fee. Alternatively, in the case of video-recording a TV program received at a mobile terminal, there is a problem which follows. When the broadcast reception state becomes inferior as a result of the fact that a user who holds the mobile terminal moves to an underground city area or the like, it is no longer possible to video-record the TV program that he or she wishes to watch and listen.

A broadcast reception system with enhanced user's usability and a mobile terminal and a server for use therein are required.

SUMMARY

A broadcast reception system in accordance with the present invention includes a broadcast-receivable mobile terminal and a server capable of sending and receiving data to and from the mobile terminal. The mobile terminal has a first broadcast receiver unit for receiving a broadcast and a first communication unit capable of sending and receiving data to and from the server. The server has a second broadcast receiver unit for receiving a broadcast, a second communication unit capable of sending and receiving data to and from the mobile terminal, and a second storage unit capable of storing therein the data as received by the second broadcast receiver unit. When the first broadcast receiver unit becomes inferior in its reception state, the mobile terminal transmits by the first communication unit to the server a send request information signal that requests the transmission of broadcast data. Upon receipt of this send request information, the server permits the second communication unit to send forth the data read out of the second storage unit toward the mobile terminal.

These and other objects, features and advantages of the invention will be apparent from the following more particular description of preferred embodiments of the invention, as illustrated in the accompanying drawings.

DETAILED DESCRIPTION OF THE INVENTION

A digital digital broadcast reception system in accordance with an embodiment of the invention will be explained with reference to the accompanying drawings below.

Figure 1:
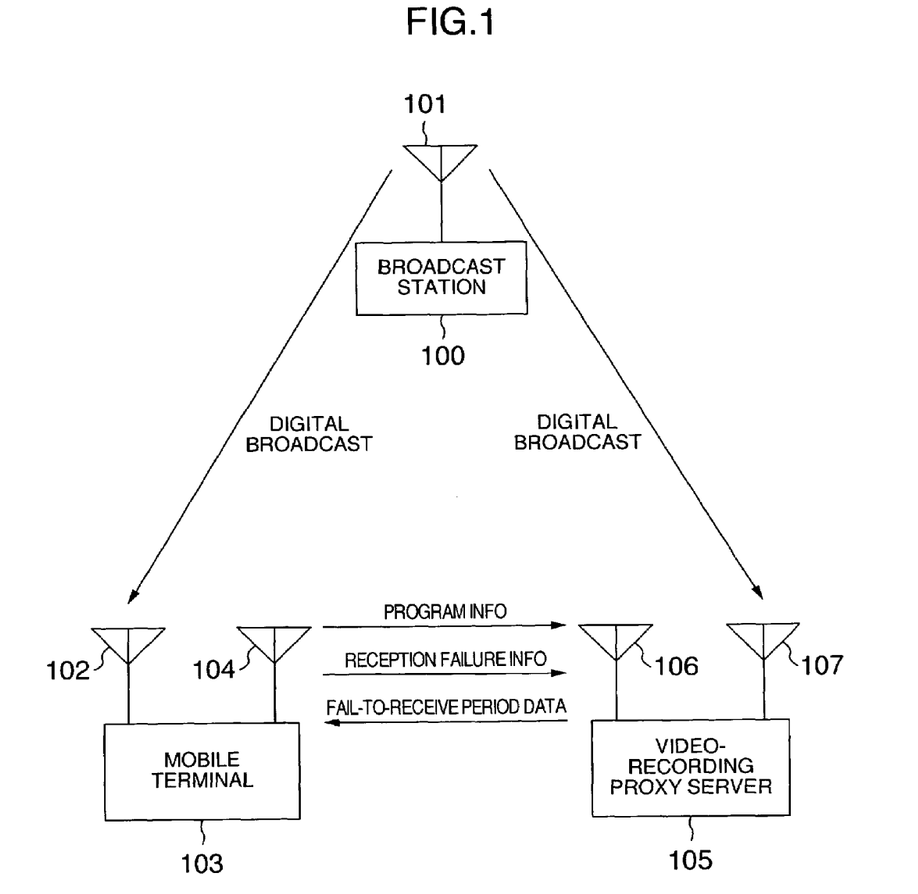
FIG. 1 is a block diagram showing one example of a digital broadcast reception system.

FIG. 1 is a block diagram showing an exemplary configuration of the broadcast reception system, which is generally made up of a broadcast station 100, a mobile terminal 103 and a server 105 that functions to vicariously perform video-recording tasks on behalf of users or subscribers (referred to hereinafter as video-recording "proxy" server).

Digital broadcasts are sent over the air from the broadcast station 100 via a broadcast transmission antenna 101. The mobile terminal 103 receives a digital broadcast by way of its broadcast reception antenna 102. In addition, upon inputting of information as to a certain television (TV) program that a user desires to make video-recording thereof, the mobile terminal 103 stores therein such the program reservation information while at the same time sending it to the video-recording proxy server 105 through a send/receive antenna 104 for communication use, also known as two-way communication antenna.

The video-recording proxy server 105 receives the program reservation information from the mobile terminal 103 via its two-way communication antenna 106. Based on the program reservation information, the video-record proxy server 105 receives the digital broadcast via a broadcast reception antenna 107 and makes video-recording of it. The user of the mobile terminal 103 may be required to pay a service charge in accordance with a number of times or a length of time period of such digital broadcast video-recording as executed by the video-record proxy server 105; alternatively, the user may be accounted for a fixed amount of fee per unit period, irrespective of how many or how long the video-recording is done.

It sometimes happens that during video-recording of a broadcast program at the mobile terminal 103 based on the saved program reservation information, the digital broadcast reception state becomes inferior resulting in occurrence of a reception failure time period with the lack of an ability to receive the digital broadcast. In such case, reception failure information indicative of a time period in which broadcast receivability is lost is sent forth to the video-recording proxy server 105 via the two-way communication antenna 104 after time out of the on-air TV program.

The video-recording proxy server 105 receives the reception failure information from the mobile terminal 103 via the two-way communication antenna 106. Based on this reception failure information, the video-record proxy server 105 sends only a portion of data corresponding to the reception failure time period via the two-way communication antenna 106 to the mobile terminal 103.

As only part of data within the reception failure period is sent to the mobile terminal 103 in this way, it is possible to reduce the amount of data to be sent and received via a communication link and also shorten the length of a communication time, when compared to the case of sending and receiving an entirety of digital broadcast program data. Thus it is possible to reduce a communication fee charged to the user while simultaneously lessening a communication link occupation factor. This in turn makes it possible to promote effective use of communication link resources.

Figure 2:
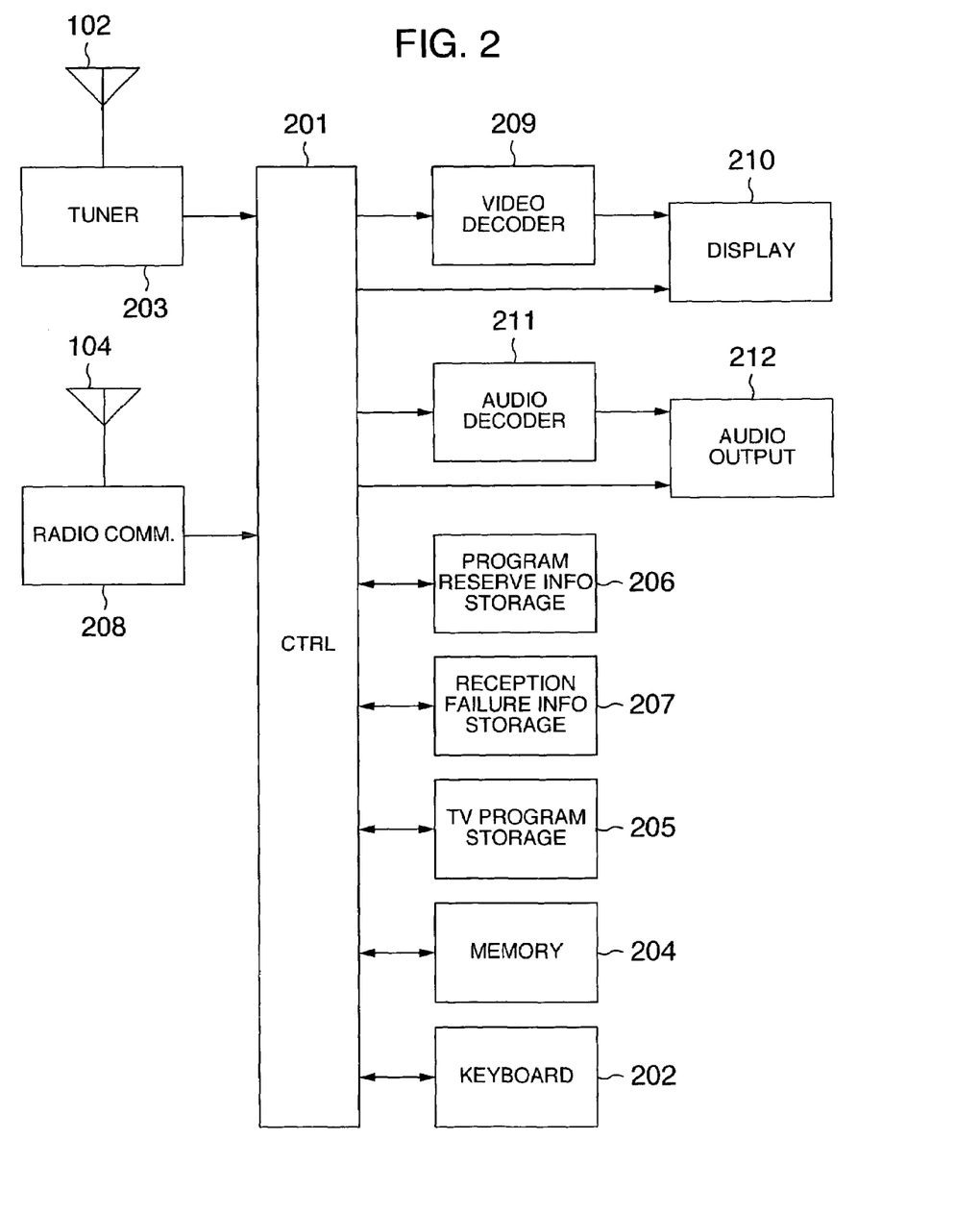
FIG. 2 is a block diagram showing an exemplary internal configuration of a mobile terminal.

Turning to FIG. 2, there is shown in block diagram form an exemplary internal configuration of the mobile terminal 103. The same parts or components as those shown in FIG. 1 are designated by the same reference numerals, with repetitive explanations thereof eliminated herein.

A control unit 201 is made up of a central processing unit (CPU) or the like, for providing operation control over an entirety of the mobile terminal 103. A manual operation unit 202 may be a keyboard which has a plurality of key buttons including numeric keys and function keys for permitting entry of data and instructions from the user. A channel selection unit 203 is a tuner for choice of a digital broadcast, which is operable to demodulate a received digital broadcast and output digital data. Additionally, this demodulation involves an error correction operation using error correction codes as contained in the broadcast. A radio communication unit 208 is a modulator/demodulator device which performs over-the-air radio communications, such as a code division multiple access (CDMA) modem or else.

The mobile terminal 103 also includes a memory unit 204 which stores therein an operation software program(s) of the controller 201, a TV program storage unit 205 that performs video-recording and saving tasks of a digital broadcast program being received, a TV program reservation information storage unit 206 for saving the information of a broadcast program that is reserved or "booked" for video-recording, and a reception failure information storage unit 207 for saving the time data of a reception failure time period of the TV program. These units 204-207 may be separate random access memories (RAMs) respectively. Alternatively, the storage unit 204 and the program storage unit 205 and others may be provided in a single memory. Still alternatively, a detachable external storage medium, such as a memory card, is employable. For example, the TV program storage unit 205 may be designed as an external storage medium, while the storage unit 204 et seq may be made up of one or more RAMs. An increased amount of digital broadcast program data is storable by letting the program storage unit 205 be an external storage medium while providing switching capabilities of a plurality of storage media.

A video decode unit 209 is a decoder which decodes compressed video data. A display unit 210 is typically a liquid crystal display (LCD) monitor, which visually displays on its screen a video image decoded by the video decoder 209. An audio decode unit 211 is a decoder that decodes compressed audio/voice data. An audio output unit 212 is more than one speaker for output of audio/voice sounds decoded at the audio decoder 211. Optionally, the display unit 210 may be designed to employ a touch panel scheme with the capability of entering text and numerical characters and user instructions while the user touches the display screen by use of a pen-like tool or his or her finger. With such an arrangement, it is possible for the user to selectively use either the manual operation unit 202 or the display panel 210 in accordance with in-use circumstances and information to be entered. Additionally the operation unit 202 may be omitted in order to downsize the mobile terminal 103.

Upon reception of a digital broadcast via the broadcast reception antenna 102 and the channel selector 203, the data received is temporarily saved in the memory unit 204. The temporarily saved digital broadcast data is subdivided or split into compressed video data and compressed audio data under control of the controller 201. The compressed video data is decoded at the video decoder 209 and then visually displayed on the display panel 210. The compressed audio data is decoded at the audio decoder 211 and is output as audio/voice sounds from the audio output unit 212.

In the case of video-recording of a digital broadcast program, digital broadcast data is saved in the TV program storage unit 205. Digital data received via the two-way communication antenna 104 and radio communication unit 208 is temporarily saved in the memory unit 204. The temporarily stored data is subject to data separation at the controller 201 for display on the display panel 210 in the case of text data, such as E-mails, or for output as audio/voice sounds at the audio output unit 212 in the case of audio data, such as phone calls. In addition, under control of the controller 201, the data being saved in the storage unit 204 or else is read out for transmission as digital data via the two-way communication antenna 104 and radio communication unit 208.

Figure 3:
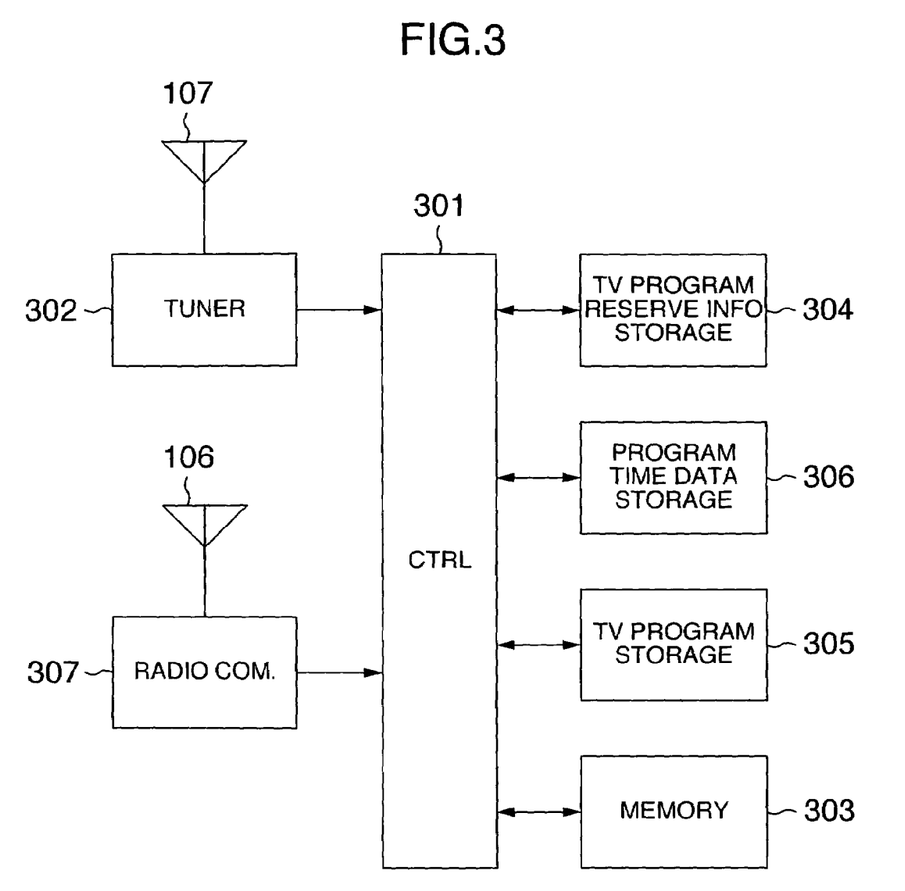
FIG. 3 is a block diagram showing an exemplary internal configuration of a server which is operable to substitute or surrogate execution of video-recording tasks.

See FIG. 3, which is a block diagram showing an exemplary internal configuration of the video-recording proxy server 105. The same components as those shown in FIG. 1 are designated by the same reference numerals, with their explanations eliminated herein.

A control unit 301 is a CPU that provides control over an entirety of the video-recording proxy server 105. A channel selector 302 is a tuner for selecting one from among digital broadcasts. A radio communication unit 307 is a modem that performs radio communication. There are provided a memory module 303 which stores an operation program(s) and the like of the controller 301, a TV program reservation information storage unit 304 for saving program reservation information of a digital broadcast program, a program storage unit 305 that performs video-recording and saving tasks of a digital broadcast program received, and a time data storage unit 306 for saving time information of the video-recorded and saved TV program. These units 303-306 are each configured from a RAM or else. It should be noted that this invention is not limited to such the approach to designing the storage 303 and others as separate memory chips respectively and may alternatively be arranged so that these are integrated together into a single memory. Note however that in order to enable storage of a large capacity of digital broadcast data, it is desirable to design the TV program storage unit 305 in the form of a separate recorder module, such as a hard disk drive (HDD) or the like.

The video-recording proxy server 105 receives, via the two-way communication antenna 106 and the radio communication unit 307, TV program reservation information as sent from the mobile terminal 103, and stores it in the program reservation information storage unit 304. Based on the TV program reservation information, it receives a digital broadcast via the broadcast reception antenna 107 and then video-records and saves it in the TV program storage unit 305. In addition, the time data concerning the video-recorded/saved TV program is saved in the time data storage unit 306.

The video-recording proxy server 105 receives reception failure information from the mobile terminal 103 through the two-way communication antenna 106 and the radio communication unit 307. Based on this reception failure information, it transmits (data transfer) only part of the data within a specific time period in which the mobile terminal 103 fails to receive the aimed TV program, toward the mobile terminal 103 via the two-way communication antenna 106 and radio communication unit 307.

Figure 4:
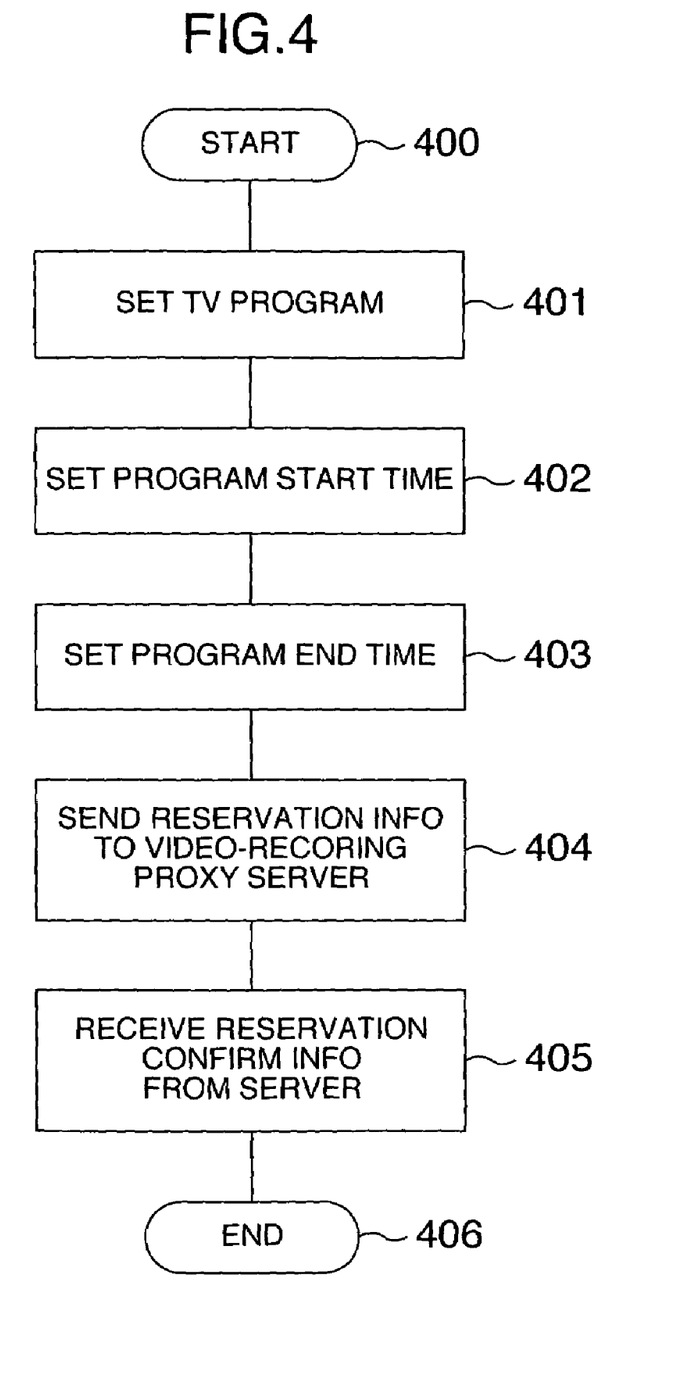
FIG. 4 is a flow diagram showing one example of broadcast program video-recording reservation processing at the mobile terminal.

See FIG. 4, which is a flow chart showing one example of a TV program video-recording procedure at the mobile terminal 103. A software program for execution of this TV program video-recording processing is saved in the memory unit 204. Based on this software program, the controller 201 executes the processing.

Figure 9:
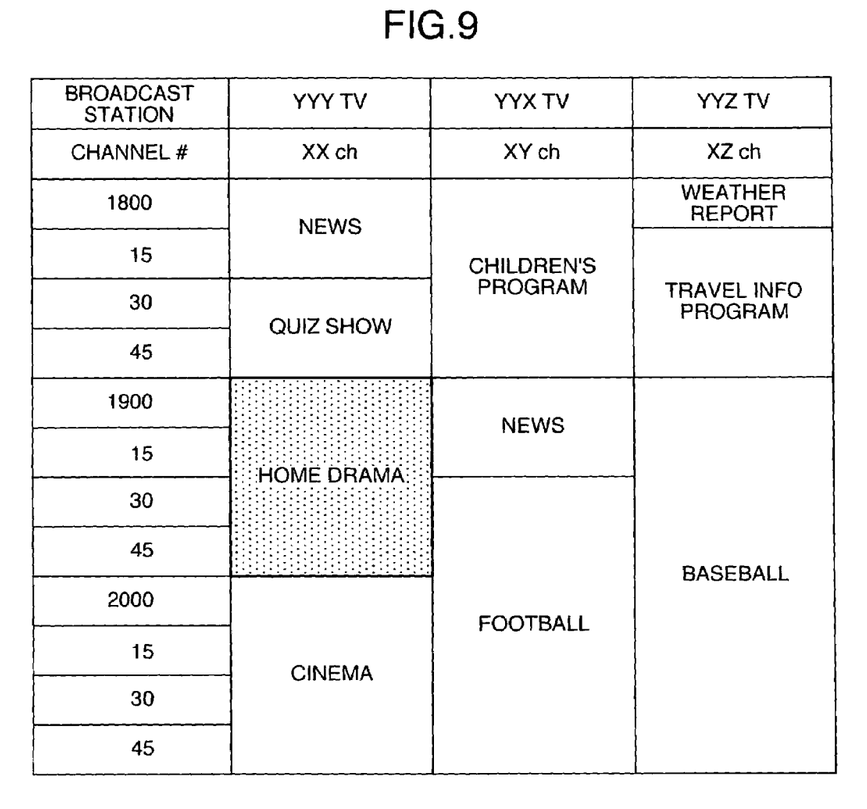
FIG. 9 is a diagram showing one example of a TV program selection menu screen to be displayed at the mobile terminal.

When inputting from the user an instruction for switching to a TV program reservation mode, video-recording reservation processing gets started (at step 400). The user is expected to select by using the manual operation unit 202 his or her desired digital broadcast program to be subject to video-recording (at step 401). For example, an electronic program guide (EPG) scheme is used to display a TV program selection menu such as shown in FIG. 9 for permitting the user to select his or her preferred one from among the broadcast programs as listed in this EPG menu. In the example of FIG. 9, a home drama is selected, which begins from 19:00 (7 p.m.) of "YYY" TV. Additionally, the EPG is such that guide data as sent from the broadcast station 100 or the video-recording proxy server 105 is prestored in the TV program reservation information storage unit 206 and is then used to visually display a TV program selection menu. Alternatively, it is permissible to receive it from the broadcast station 100 when the user changes to the program reservation mode. Still alternatively, the same is available via the Internet (not shown).

Once a TV program is selected, information contained in the EPG is used to perform the setting of a program start time (at step 402) and the setup of an on-air end time of the program (at step 403), resulting in generation of TV program reservation information. This program reservation information thus created is saved in the program reservation information storage unit 206. Then, the mobile terminal 103 sends forth the program reservation information toward the video-recording proxy server 105 (at step 404). Next, it receives reservation confirmation information from the video-record proxy server 105 (step 405), and terminates the video-recording reservation processing (step 406).

Figure 11:
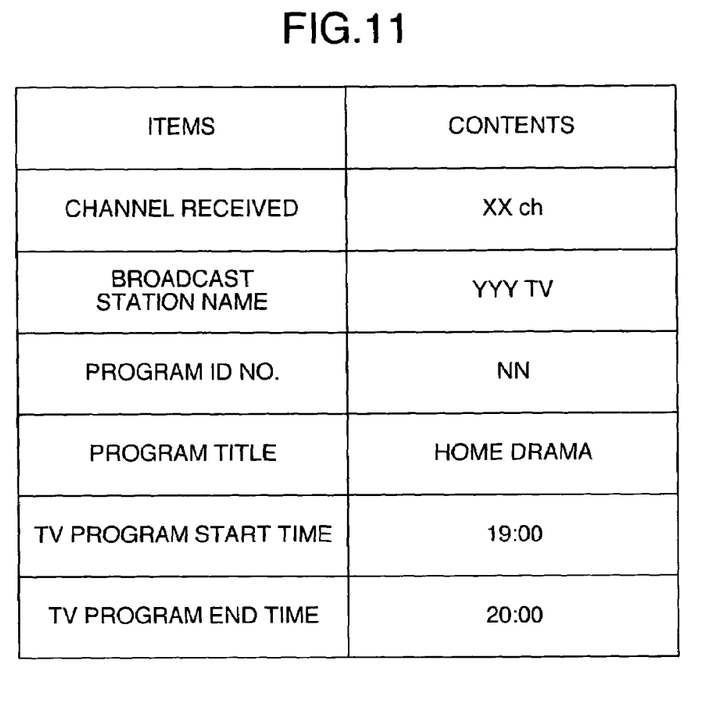
FIG. 11 is a diagram showing one example of program reservation information.

FIG. 11 shows one example of the TV program reservation information, which is generated when a home drama is selected from the program selection menu screen shown in FIG. 9. As shown in FIG. 11, several settings are done so that a channel to be received is "XX ch," a broadcast station name is "YYY TV," a program identification (ID) number is "NN," a program title is "home drama," a broadcast program start time is "19:00" (7 p.m.), and a broadcast program end time is "20:00" (8 p.m.). Note that these items and setup contents are not limited to those of the example of FIG. 11. For instance, the setup contents may consist of only the reception channel, the broadcast program start time and the broadcast program running time. Alternatively only the program ID number may be set up.

Although in this embodiment the TV program reservation information as used herein is EPG data to be created from service information (SI) that is program list data, this invention is not limited thereto and may alternatively be arranged so that the user uses the manual operation unit 202 to input his or her preferred reception channel, video-recording start time, video-recording end time, and program ID information, respectively. Using such the SI data makes it possible for the user, in case the broadcast on-air time is changed due to an extension of the scheduled time of a baseball game, to become aware of its change from the program ID number. This enables preclusion of video-recording mistakes.

Figure 5:
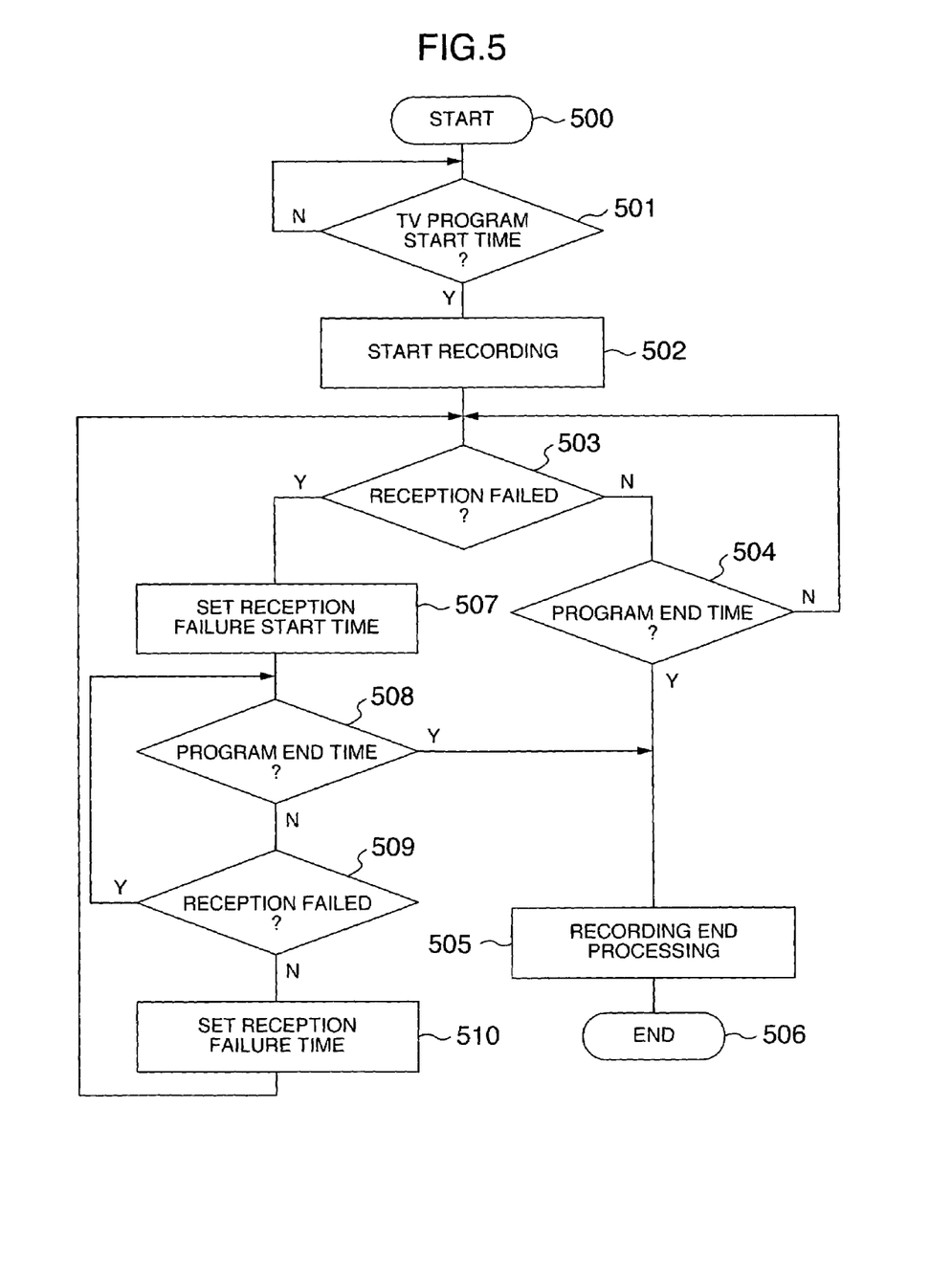
FIG. 5 is a flow chart showing one example of digital broadcast receiving/recording processing at the mobile terminal.

FIG. 5 is a flowchart showing one example of digital broadcast reception/video-recording processing at the mobile terminal 103. As in the TV program reservation procedure stated above, a software program for execution of this processing is prestored in the memory unit 204 and executed by the controller 201.

Upon setup of a TV program video-recording reservation, the processing gets started (at step 500). The controller 201 detects whether it becomes a TV program on-air start time which was set by the program video-recording reservation procedure (at step 501). When reaching the TV program start time, start video-recording for sequentially recording and saving video data to the TV program storage unit 205 (step 502).

During the video-recording/saving session, monitoring is performed on a steady basis to check whether a TV reception failure takes place (at step 503). The reception failure occurrence state refers to a state in which the broadcast reception antenna 102 is incapable of receiving any broadcast data or a state in which the channel selector 203 is not able to demodulate a digital broadcast received. In the case of proper broadcast reception, determine whether it reaches the on-air end time of the TV program (at step 504). If it does not yet reach the TV program's end time, then continue the video-recording/saving to the program storage unit 205. If it reaches the program end time then stop the video-recording (step 505).

On the other hand, in case a reception failure occurs, let a start time of such reception failure be saved as a reception failure start time in the reception failure information storage unit 207 (at step 507). In this case, interrupt the video-recording/saving to TV program storage unit 205. When reaching the program's on-air end time during reception failure (at step 508), perform completion processing of the video-recording/saving (step 505), followed by termination of the digital broadcast reception video-recording procedure (step 506). In this case, save the TV program end time as a reception failure end time in the reception failure information storage unit 207. In case it does not yet reach the TV program end time, determine whether the reception failure is still continuing (step 509). If the reception failure is continuing, then go to step 508.

When it is determined at step 509 that the reception failure disappears and proper reception is established, let the time point at which such decision was made be saved in the reception failure information storage unit 207 as a reception failure end time (at step 510), and then restart the video-recording to TV program storage unit 205. Note here that the proper reception state is a state that the broadcast reception antenna 102 receives broadcast data and the channel selector 203 demodulates the received digital broadcast to thereby enable output of digital data.

Figure 12:
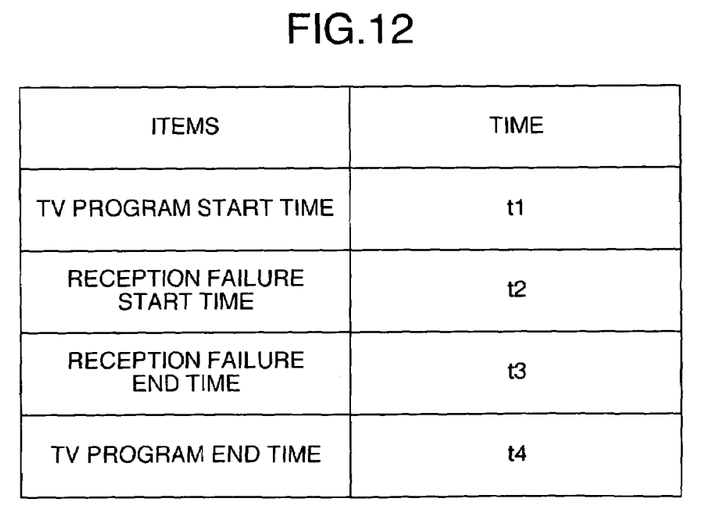
FIG. 12 is a diagram showing one example of reception failure information.

FIG. 12 shows one example of the reception failure information. This reception failure information has a broadcast program on-air start time, a reception failure start time, a reception failure end time, and a broadcast program on-air end time, which means that a single reception failure event occurs and that a fail-to-receive time period of the broadcast program spans from a time point t2 to t3. For example, in case more than two reception failure periods take place, a plurality of sets of reception failure start time and reception failure end time may be contained in a single item of reception failure information. Alternatively, reception failure information may be created, once at a time, whenever a fail-to-receive period occurs. Additionally, in case it reaches the program end time during reception failure, the program end time t4 per se becomes the reception failure end time.

Regarding the items and contents, the invention should not be limited to those of the example of FIG. 12. For instance, these may consist of only the reception failure start time and the reception failure end time.

Figure 6:
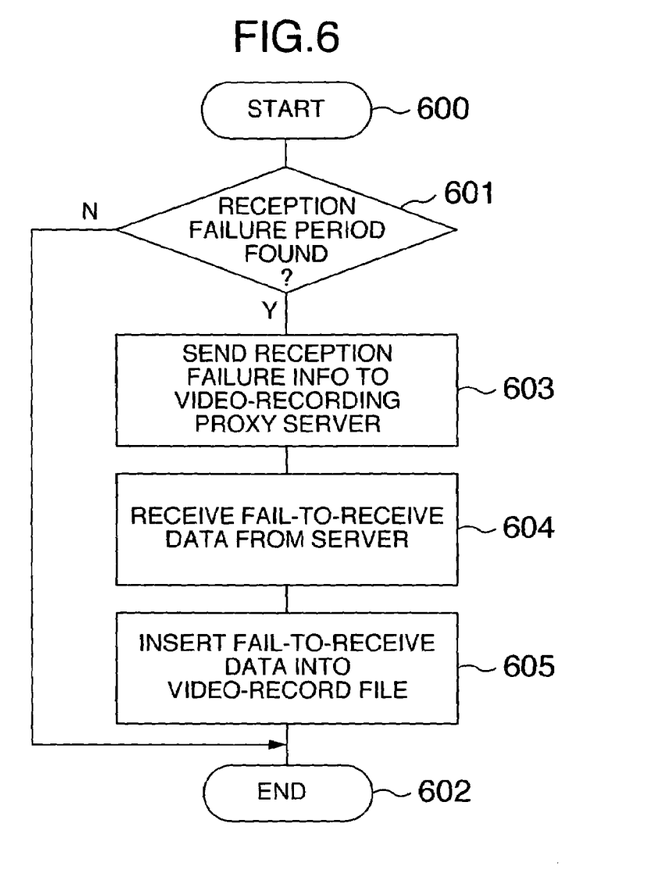
FIG. 6 is a flowchart showing one example of a procedure for acquisition of data within a reception failure time period at the mobile terminal.

FIG. 6 is a flowchart showing one example of the processing for acquiring data within a fail-to-receive time period at the mobile terminal 103. As in other processing software programs, a program for executing this processing is stored in the memory unit 204, based on which the controller 201 executes the processing.

After completion of video-recording, the fail-to-receive period data acquisition processing gets started (at step 600). Note that this data acquisition processing may be arranged to automatically start after having completed the video-recording or alternatively to start in responding to receipt of a request from the user.

The reception failure information being presently saved in the reception failure information storage unit 207 is used to determine whether a fail-to-receive time period is present in the resultant recorded/saved file (at step 601). If it is decided that such fail-to-receive period is absent, then terminate the processing (step 602).

On the other hand, in case the fail-to-receive period is determined to exist, send the reception failure information being saved in the reception failure information storage unit 207 toward the video-recording proxy server 105 (at step 603), and receive (data transfer) data of the fail-to-receive period from the video-record proxy server 105 (at step 604). The fail-to-receive period data as received from the video-record proxy server 105 at step 604 is then inserted into the video-record/save file that is presently saved in the TV program storage unit 205 (at step 605), resulting in accomplishment of a fault-free or "complete" video record file of the broadcast program of interest.

Figure 7A:
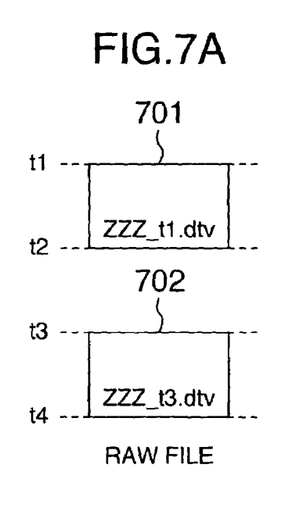
FIGS. 7A to 7C are pictorial representations for explanation of a method for inserting reception failure period data into a video-record/save file.
Figure 7B:
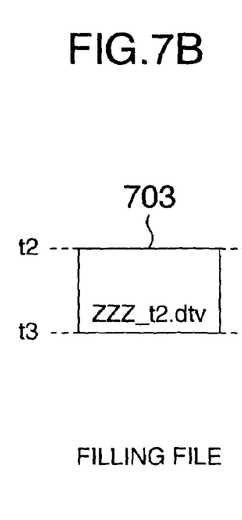
Figure 7C:
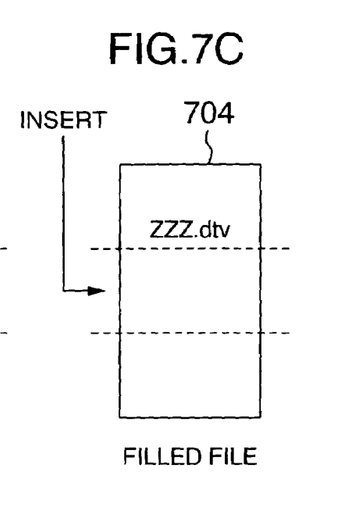

A method for inserting the fail-to-receive period data into the TV program record/save file with reference to FIGS. 7A to 7C.

FIG. 7A shows one example of the video-record/save file in the event that a reception failure occurs during video-recording of a digital broadcast program. In this example, while a video-recording/saving session starts from a broadcast program on-air start time t1, a reception failure occurs at time point t2 so that a file t1 ("ZZZ_t1.dtv") 701 is saved as a video record file of from time point t1 to time t2. Thereafter, the reception failure disappears at time t3 so that video-recording is restarted from time t3, saving a file t3 ("ZZZ_t3.dtv") 702 as a record file covering up to the broadcast program end time t4. A duration spanning from time point t2 to time t3 becomes a fail-to-receive period. FIG. 7B shows a video record file t2 ("ZZZ_2.dtv") 703, which was created by receipt (via data transfer) of data of the fail-to-receive period from the video-recording proxy server 105.

By inserting this video record file t2 (ZZZ_t2.dtv) 703 into a gap space between the record file t1 (ZZZ_t1.dtv) 701 and the record file t3 (ZZZ_t3.dtv) 702, it is possible to create a data file of the entire digital broadcast of from the broadcast program start time t1 up to the broadcast program end time t4. A practically reduced approach is as follows: record the information indicative of an on-air time of the data recorded to those headers of the record file t1 (ZZZ_t1.dtv) 701 and record file t2 (ZZZ_t2.dtv) 703 plus record file t3 (ZZZ_t3.dtv) 702; then, use these information items to sequentially couple together the record files in the on-air order thereof; next, create a complete record file (ZZZ.dtv) 704 shown in FIG. 7C.

It is noted that the information to be recorded to the video-record files should not be limited to the on-air time indicating information as recorded to the headers. There may alternatively be used the information indicating a packet number of a transport stream (TS) packet indicative of a position from the top of a TV program, a program clock reference (PCR) that is a program time reference value, a presentation time stamp (PTS) which is a time stamp indicative of a display time and others.

Figure 8:
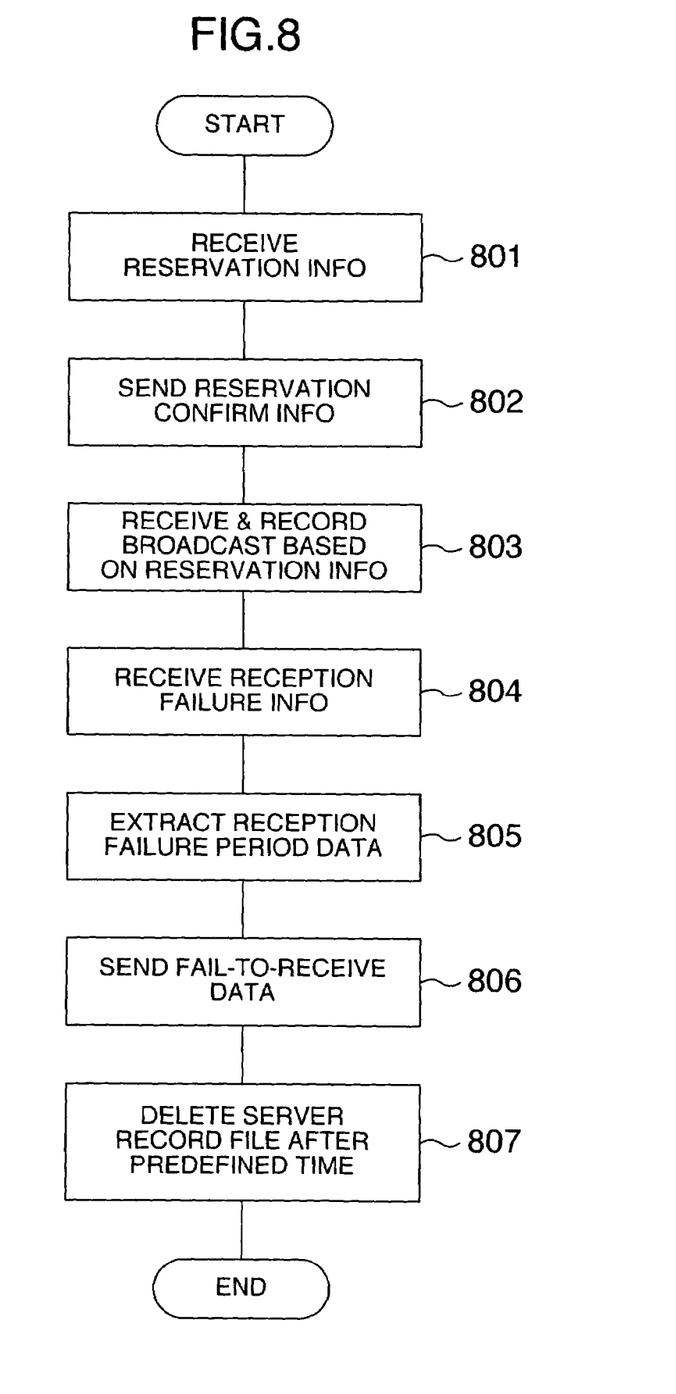
FIG. 8 is a flowchart showing one example of reception failure period data transmission processing at the video-recording vicarious execution server.

FIG. 8 is a flowchart showing one example of fail-to-receive period data transmission processing at the video-recording proxy server 105. A software program for executing this processing is prestored in the memory unit 303 and executed by the controller 301.

Upon receipt of TV program reservation information from the mobile terminal 103 via the two-way communication antenna 106 and the radio communication unit 307 (at step 801), the video-recording proxy server 105 sends forth reservation confirmation information to the mobile terminal 103 (at step 802). The program reservation information received is saved in the program reservation information storage unit 304.

Based on the program reservation information saved in the program reservation information storage unit 304, set a reception channel of the channel selector 302. When reaching the TV program on-air start time, receive a digital broadcast via the broadcast reception antenna 107 and channel selector 302, and then video-record and save it in the TV program storage unit 305 (at step 803).

When receiving reception failure information from the mobile terminal 103 (at step 804), use time data of the video-recorded/saved TV program that was stored in the TV program time data storage unit 306 to thereby extract a corresponding data portion of a fail-to-receive period from the record/save file being stored in the program storage unit 305 (at step 805). Send (data transfer) the extracted data to the digital broadcast receivable mobile terminal 103 with video-recording functionality via the two-way communication antenna 106 and radio communication unit 307 (at step 806).

At the video-recording proxy server 105, delete the video-record/save file after elapse of a preset length of time from a time point whereat the recording/saving was done (at step 806).

Although in this embodiment the mobile terminal 103 is arranged to transmit the reception failure information after the end of a TV program, it may also be designed in a way which follows: if a communication link is in a signal transmittable state, the mobile terminal sends the reception failure information indicative of the start of a fail-to-receive time period when it goes into a broadcast receivable state and transmits the reception failure end information indicative of the expiration of the fail-to-receive period when it goes into a receivable state. In this case, the video-recording proxy server 105 may be arranged in such a way as to sequentially erase the recorded video data in the event that it does not receive any start information from the user within a predefined length of time period—for example, ninety (90) minutes. If this is the case, the video-record proxy server 105 is no longer required to video-record the entirety of the broadcast program. An alternative approach is to send from the mobile terminal 103 the reception failure information containing therein the start and end information when going into the receivable state.

Although in the above-noted embodiment the fail-to-receive data is received from the video-recording proxy server 105 after the end of a TV program, it is also permissible to cause it to receive the fail-to-receive data from the video-record proxy server 105 without having to wait for the end of TV program. In this case, it is possible to perform the creation of a video-record/save file which is filled with the fail-to-receive data during video-recording/saving or immediately after completion of the recording/saving. Thus it is possible to rapidly create the fail-to-receive data-filled record/save file when compared to the embodiment stated supra.

An explanation will next be given of a processing method for use in cases where a reception failure occurs while the user is watching and listening to a digital broadcast without making video-recordings thereof.

Figure 10:
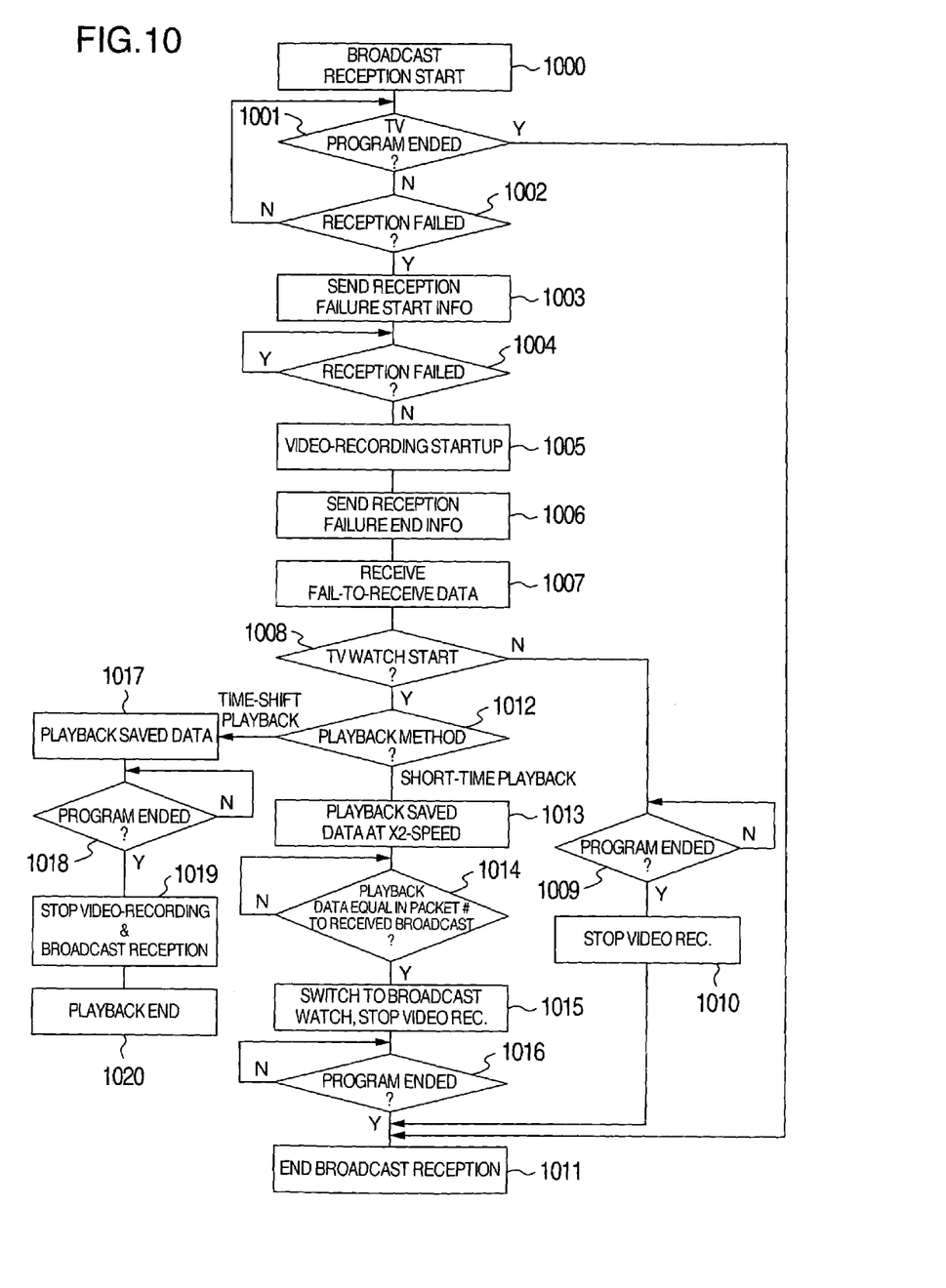
FIG. 10 is a flowchart showing one example of program watch/listen processing at the mobile terminal.

FIG. 10 is a flowchart showing one exemplary TV program watch/listen processing at the mobile terminal 103. A software program for execution of this processing is stored in the memory unit 204 and executed by the controller 201.

Upon startup of broadcast reception (at step 1000), detect whether the TV program being watched is ended (step 1001). If the program does not end yet, then perform detection of a present broadcast reception state (step 1002).

When detecting occurrence of a reception failure of the presently received digital broadcast (at step 1002), send to the video-recording proxy server 105 reception failure start information having time data indicative of a time point at which the reception failure occurred and TV program information or else (at step 1003). The program information is a stream of data indicative of a reception channel and a program title along with a program identifying number or code. The video-record proxy server 105 is responsive to receipt of the reception failure information, for starting video-recording required. In case the TV program is ended in the middle of the reception failure state, terminate digital broadcast reception, and send to the video-record proxy server 105 the reception failure end information consisting essentially of time data and TV program information and others.

Upon detection of an improvement of the reception failure (at step 1004), video-recording of the received digital broadcast gets started to save video record data in the TV program storage unit 205 (at step 1005). Then, send to the video-recording proxy server 105 the reception failure end information that consists essentially of time data indicative of a time point whereat the reception failure ended and program information (at step 1006). Next, receive fail-to-receive data from the video-recording proxy server 105 (step 1007). Let the received fail-to-receive data be saved in the program storage unit 205. Optionally, the fail-to-receive data from the video-record proxy server 105 and the video-recorded/saved TV program (record/save file) may be combined together into a single record/save file.

Upon receipt of the fail-to-receive data from the video-recording proxy server 105, display on the display panel 210 a message "TV Viewing Restart?" for confirming the user whether he or she wants to restart TV watching (at step 1008).

In case the user does not want such TV watching, when detecting the end of TV program (step 1009), stop the video-recording (step 1010), and terminate the broadcast reception (step 1011).

When the user wishes to watch the TV program, ask the user to provide his or her confirmation as to which one of time-shift playback and short-time playback is performed (at step 1012). Note here that the time-shift playback refers to a method for sequentially reproducing at a normal speed the data received from the video-recording proxy server 105 and the video data recorded at the mobile terminal 103 while at the same time continuing video-recording up to the end of the TV program. The short-time playback is a method for playing back at a two-time (2×) speed the data received from the video-record proxy server 105 and the video data recorded at the mobile terminal 103 until catch up to a presently on-aired TV program and for switching to the digital broadcast watching after catch up with the TV program being presently broadcasted. Note that the short-time playback is not limited to the 2× speed and may be set at any speeds beyond 1× speed: the playback speed may be set to 1.1× speed or more than 3× speed. Also note that the short-time playback may be arranged so that only digest portions in the TV program are reproduced. For example, in the case of a sports program, reproduce only those scenes in which audio/voice sounds such as the audience's glad shouts are greater than a predefined level.

When the user chooses the short-time playback, what is done first is to play back at 2× speed the fail-to-receive data from the video-recording proxy server 105. After having completed the playback of the fail-to-receive data, start 2×-speed playback of the video data being recorded at the mobile terminal 103 (step 1013).

Then, compare a packet number of transport stream (TS) packet of the playback data (packet number of TS packet indicating a position from the top of a program) to a packet number of a presently received digital broadcast (at step 1014). In case the packet number of the playback data becomes identical to or comes near to the packet number of the received broadcast, it is judged that the playback of recorded video data catches up with a presently received digital broadcast. In this event, switch to the digital broadcast watching, and stop video-recording (step 1015). Thereafter, when the TV program is ended (step 1016), stop the broadcast reception (step 1011). Although in this embodiment the packet number of TS packet indicating the position from the program top is used in order to judge whether the playback of the recorded video data catches up to the digital broadcast, this invention is not exclusively limited thereto and may alternatively be arranged so that such judgment is made by use of a program clock reference (PCR) that is a program reference value and/or a presentation time stamp (PTS) that is a time stamp indicative of a display time. It is also permissible to automatically erase the video-record/save file that is stored in the program storage unit 205 when shifting to the digital broadcast watching. Whereby, it is possible to effectively use the storage capacity of the TV program storage unit 205.

In case the user selected the time-shift playback, sequentially reproduce at the normal playback speed the data received from the video-recording proxy server 105 and the video data recorded at the mobile terminal 103 (at step 1017). When the TV program is ended (step 1018), stop the video-recording, and exit the broadcast reception (step 1019). After having reproduced the recorded video data to the end of it, stop the playback (step 1020).

Although in this embodiment the fail-to-receive data is received from the video-recording proxy server 105 after the mobile terminal 103 becomes better in its digital broadcast reception state and then the received data is subject to playback, the invention is not limited thereto. Another approach is available, which has the steps of sequentially receiving digital broadcast data from the video-record proxy server 105 after transmission of the reception failure start information, ask the user to provide his or her confirmation as to whether TV watching gets started or not when the received data becomes greater than or equal to a prespecified level, and starting playback even before the reception state becomes better.

While in the above-stated digital broadcast reception system the video-recording proxy server is provided separately from the broadcast station, the broadcast station may be constructed to have the functions of such video-record proxy server.

Alternatively, a certain device rather than an exclusive-use or "dedicated" video-recording proxy server is employable as the video-recording proxy server 105, which device is capable of receiving digital broadcasts at those locations less in reception state variation while offering video-recording capabilities (for example, another type of digital broadcast receivable mobile terminal with video-recording functions added thereto). Still alternatively, the broadcast station is modifiable to video-record all or some of TV programs and provide fail-to-receive period data based on reception failure information in reply to requests from users or subscribers.

Additionally, although in the above embodiment the radio communications network is used, wire or cable communication networks are also employable. For example, a method for permitting download from a personal computer (PC) linked to a video-recording proxy server over the Internet network may be utilized. Optionally, a video-record request may be issued to the video-recording proxy server not only when reception failures occur but also when any proper reception becomes disabled or there is the possibility that video-recording is hardly executable since the mobile terminal becomes less in battery power level.

Although digital broadcasts include terrestrial digital broadcasts using ground waves and digital broadcasts via a satellite(s), these are the same in that each is a digital broadcast using radio waves, and thus the present invention is applicable thereto.

It must be noted that the mobile terminal is not limited to the one carried by the user and is interpreted to include an in-vehicle mobile phone as built in land vehicles.

As apparent from the foregoing, according to the embodiment, it is possible to provide a broadcast reception system with improved usability for users who enjoy broadcast contents by mobile terminals along with a mobile terminal and a server for use in the system.

While the invention has been disclosed and illustrated with reference to particular embodiments, the principles involved are susceptible for use in numerous other embodiments, modification and alterations which will be apparent to persons skilled in the art to which the invention pertains. The invention is, therefore, to be limited only as indicated by the scope of the appended claims.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A broadcast reception system comprising:
a mobile terminal capable of receiving a broadcast; and
a server capable of sending and receiving data to and from the mobile terminal;
the mobile terminal including a first broadcast receiver for receiving a broadcast and a first communication unit capable of sending and receiving data to and from the server; and
the server including a second broadcast receiver for receiving a broadcast, a second communication unit capable of sending and receiving data to and from the mobile terminal, and a memory capable of storing data received from the second broadcast receiver, wherein:
when a reception state of the first broadcast receiver becomes inferior, the mobile terminal transmits by the first communication unit toward the server a send request information for requesting transmission of broadcast data,
upon receipt of the send request information from the mobile terminal, the server reads data out of the memory and transmits the data by the second communication unit toward the mobile terminal, and
the send request information contains identification information indicative of a type of broadcast program and time information indicating a time point whereat the reception state of the first broadcast receiver becomes inferior.

2. The broadcast reception system according to claim 1, wherein the type of broadcast program is any one of information relating to a broadcast program title and a program identification number.

3. The broadcast reception system according to claim 1, wherein the data as read out of the memory is broadcast data within a time period in which broadcast reception is failed by the first broadcast receiver.

4. The broadcast reception system according to claim 1, wherein:
the first broadcast receiver has an antenna and a channel selector, and
an event that the reception state becomes inferior is one of a state in which the antenna is incapable of receiving a broadcast and a state in which the channel selector is incapable of demodulating the broadcast received by the channel selector.

5. A mobile terminal comprising:
a broadcast receiver which receives a broadcast;
a communication unit capable of sending and receiving data to and from a broadcast recordable server; and
a controller for controlling, when a reception state of the broadcast receiver becomes inferior, so that the communication unit transmits to the server a send request information for requesting transmission of broadcast data, wherein:
the communication unit receives one of the broadcast data incapable of being received by the broadcast receiving unit and data within a time period incapable of demodulating the broadcast received, and
the send request information contains identification information indicative of a type of broadcast program and time information indicating a time point whereat the reception state of the broadcast receiver becomes inferior.

6. The mobile terminal according to claim 5, wherein the type of broadcast program is any one of information concerning a broadcast program title and a program identification number.

7. The mobile terminal according to claim 5, further comprising:

a memory capable of storing data received by one of the broadcast receiver and the communication unit; and a playback device for reproducing the data being stored in the memory, wherein:

the data sent from the server is stored in the memory while letting the data received by the broadcast receiver be stored in the memory when the reception state of the broadcast receiver becomes good, and the playback device reproduces the data received by the broadcast receiver after having reproduced the data as sent from the server from the memory.

8. The mobile terminal according to claim 7, wherein the playback device has a first playback mode for reproduction of the data being stored in the memory at a one-time speed and a second playback mode for reproduction of the data at a speed greater than the one-time speed.

9. The mobile terminal according to claim 5, wherein:

the broadcast receiver has an antenna and a channel selector, and an event that the reception state becomes inferior is one of a state in which the antenna is incapable of receiving a broadcast and a state in which the channel selector is incapable of demodulating the broadcast received by the channel selector.

10. A mobile terminal comprising:

a broadcast receiver which receives a broadcast;

a communication unit capable of sending and receiving data to and from a broadcast recordable server;

a memory capable of storing therein data received by one of the broadcast receiver and the communication unit;

a setup unit which sets a broadcast program to be stored in the memory; and a controller which provides control in such a way as to (i) store in the memory broadcast data received by the broadcast receiver upon startup of the broadcast program as set by the setup unit, (ii) stop storage of broadcast data into the memory when the broadcast receiver becomes inferior in reception state, (iii) when the reception state of the broadcast receiver becomes good, restart the storage of the broadcast data received by the broadcast receiver while causing the communication unit to send forth toward the server a send request information for requesting transmission of broadcast data, the request information containing identification information indicative of a type of broadcast program, (iv) receive by the communication unit broadcast data within one of a time period in which the broadcast receiver is incapable of receiving a broadcast and a period in which the broadcast received is incapable of demodulation, and (v) store in the memory the broadcast data received by the communication unit.

11. The mobile terminal according to claim 10, wherein the memory stores the broadcast data received by the communication unit along with broadcast data received by the broadcast receiver.

12. The mobile terminal according to claim 10, wherein the broadcast receiver has an antenna and a channel selector, wherein an event that the reception state becomes inferior is one of a state in which the antenna is incapable of receiving a broadcast and a state in which the channel selector is incapable of demodulating the broadcast received by the channel selector, and wherein an event that the reception state becomes good is a state in which the antenna is capable of receiving a broadcast and the channel selector is capable of demodulating the broadcast received by the channel selector.

* * * * *